Dec. 2, 1952     A. A. ANDERSON     2,620,030
MULTICROP TUBE SHEAR
Filed Jan. 31, 1950
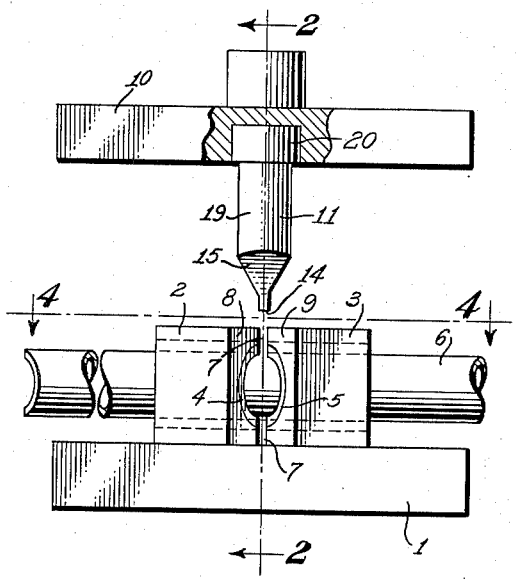
Fig.1
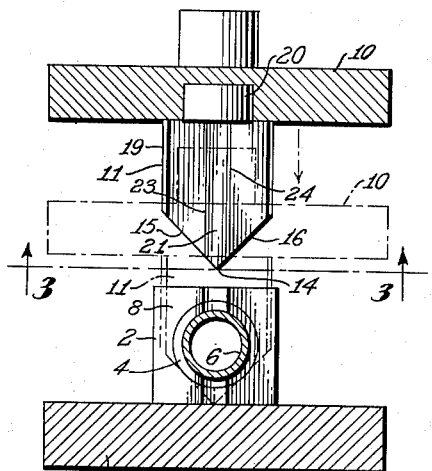
Fig.2
Fig.3
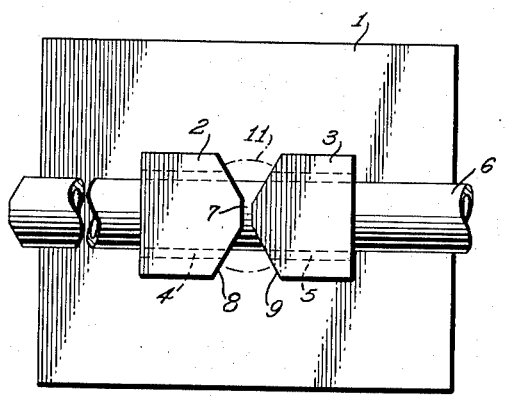
Fig.4
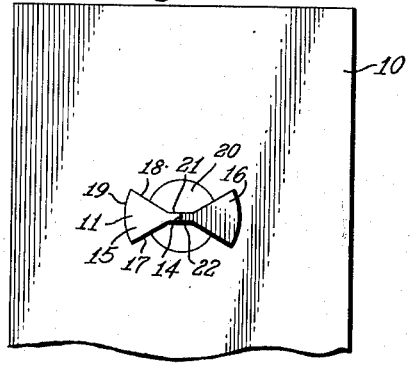
 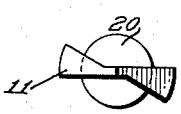
Fig.7    Fig.8
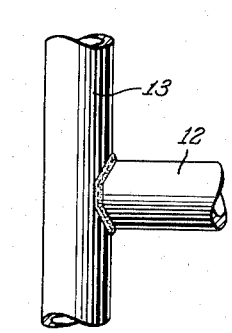
Fig.5
 
Fig.9    Fig.10
INVENTOR,
Arvid A. Anderson
BY Mason, Fenwick & Lawrence
ATTORNEYS Patented Dec. 2, 1952

2,620,030

UNITED STATES PATENT OFFICE 2,620,030

MULTICROP TUBE SHEAR

Arvid A. Anderson, West Allis, Wis., assignor to Safway Steel Products, Inc., Milwaukee, Wis., a corporation of Wisconsin Application January 31, 1950, Serial No. 141,552

3 Claims. (Cl. 164—47)

This invention relates to the shaping of the ends of tubes, particularly structural tubing used for making railings, bicycle frames and the like.

In the manufacture of structural tubing wherein it is desired to join the end of one tube with the side of another, it becomes necessary to shape or crop such tube end so that it will exactly fit a notch formed in the side of a second tube, the joint being along a somewhat arcuate path which varies and depends upon whether the tubes are at right angles or less than right angles. Heretofore, an outstanding disadvantage of commonly used processes for shaping the end of a tube so as to have the proper contour for making such joint is that it generally requires several cutting operations, at least two, for properly shaping the end. That is, it is first necessary to cut the tube to the proper length and then by a second cutting or shearing operation the end of the tube is shaped to the proper contour for joinder with another tube. Also, commonly used dies are somewhat complicated in construction, therefore are expensive to manufacture. Furthermore, they oftentimes deform the tube and leave burrs, therefore providing an irregular joint which does not give a good welding surface and which detracts from the appearance of the joint.

An object of this invention is to overcome the above named disadvantages by providing a novel shearing die means for cropping tubes to any desired length, including a die blade which is so shaped that by a single stroke thereof the tube is cut to the proper length and its end shaped to the proper contour so that it may be joined to the side of another tube which it intersects.

Other objects and advantages of the present invention will become apparent from a study of the following specification taken with the accompanying drawing wherein:

Fig. 1 is a front elevational view of a die press embodying the principles of my invention;

Fig. 2 is a side elevational view of the die press shown in Fig. 1;

Fig. 3 is a bottom view of the movable shearing die shown in Figs. 1 and 2;

Fig. 4 is a plan view of the stationary die blocks taken along line 4—4 of Fig. 1;

Fig. 5 is a plan view showing two pipes joined, the end one of which has been cropped by the die press shown in Figs. 1 to 4, inclusive;

Fig. 6 is a fragmentary perspective view of the movable shearing die, and

Figs. 7, 8, 9 and 10 are modifications of the movable shearing die showing different shapes of blades thereof for providing different shapes of crops.

Referring more particularly to Figs. 1 to 4, inclusive, numeral 1 denotes a lower stationary bed member of a die press or punch press of any well known type (not shown) and upon which bed member are mounted stationary or base die blocks 2 and 3 of somewhat cylindrical configuration. Through the registering cylindrical openings of die blocks 2 and 3 there are telescopically fitted bushing inserts 4 and 5. A pipe 6 whose end is to be cropped to a particular configuration is passed through the bushing inserts 4 and 5. It will be apparent that by changing the size or thickness of the bushing inserts, different sized pipes can be telescopically fitted therein for cutting.

As will appear more clearly in Fig. 4, the confronting ends of die blocks 2 and 3, as well as inserts 4 and 5, have surfaces which diverge outwardly from the center, the latter along arcuate paths. More specifically, there is a small space or slot 7 between the confronting surfaces through which is adapted to project the knife edge portion 14 of a movable shearing die 11 to be described more fully hereinafter. The outwardly diverging surfaces of inserts 4 and 5, as will appear more clearly in Fig. 1, extend along arcuate paths following the curvature of the pipe. Fig. 4 clearly shows that the divergent surfaces, such as 8 and 9, of the base die blocks are flat.

The upper or movable die section comprises a reciprocable plate 10 for holding the shearing die 11. The plate 10 is reciprocable upwardly and downwardly by the press in a well known manner. An important feature of the invention is the novel construction of the dies which enables, upon a single downward stroke of shearing die 11, a complete shearing action of the pipe together with a shaping action to give the end of a pipe, such as 12 shown in Fig. 5, the proper contour so it may be joined to another pipe 13. Pipe 12 has its end cropped to a contour adapting it to form an arcuate fit with a correspondingly notched pipe 13.

The shearing die 11 has a lowermost, centrally disposed knife edge 14 from which two flat shearing surfaces 15 and 16 diverge at any suitable angle, such as an angle of 90°. Distortion of the tube is prevented or controlled by selecting a suitable angle and size of blade entry. The side edges of the respective flat shearing surfaces 15 and 16 are divergent from a point adjacent the knife edge 14, as will appear more clearly in Fig. 3. That is to say, shearing surface 15, for example, has side edges 17 and 18 which diverge outwardly at any desired angle, such as an angle of 60°, and terminate in a side-forming, arcuate portion 19. Likewise, shearing surface 16 has correspondingly outwardly divergent side edges which terminate in an arcuate portion forming the opposite side of the die. A cylindrical stub 20 is provided at the upper end of the shearing die and is rigidly held by the reciprocable plate 10. Longitudinally and centrally of the shearing die there extends a flat strip portion having opposite surfaces 21 and 22 forming a blade whose lower tip readily pierces the top of the pipe to be cropped or sheared. The boundaries of surface 21 are indicated by lines 23 and 24 from which boundaries the shearing die blades diverge outwardly on each side somewhat in the form of a butterfly, as will appear more clearly in Fig. 3.

In operation, when it is desired to cut or crop a piece of pipe to the desired length, shearing die 11, together with plate 10, is moved downwardly, allowing its knife or cutting edge 14 to extend through slot 7 and pierce the top portion of pipe 6. Upon continued downward movement of the die to the position shown in dot-and-dash lines in Fig. 2, the edges of the upwardly divergent shearing or cutting surfaces 15 and 16 provide a shearing action on the pipe, thereby cutting the pipe in two along arcuate divergent paths so as to provide two opposed sheared ends, each of which has a shape corresponding to that shown at the left end of pipe 6, as viewed in Figs. 1 and 4. The cropped pipes have the same shape as the confronting ends of die blocks 2 and 3 as will be clearly apparent in Figs. 1 and 4. It will be understood, therefore, that by a downward stroke of the shearing die 11, such sheared end surfaces of the pipe are formed in confronting relationship in conformity with the contours of the confronting die blocks 2 and 3.

Thus it will be seen that with but a single downward stroke of the shearing die 11, the pipe is not only cut to the proper length, but its end is shaped similarly to pipe 12 in Fig. 5, so that it may be fitted to a correspondingly notched portion such as formed in pipe 13 and thereafter welded at the joint. By mounting a simple gauge at the left end of pipe 6, any desired length of pipe may be cropped. This constitutes considerable economy over conventional devices requiring that the pipe first be cut to the proper length and then sheared to the proper contour by a second operation.

When it is desired to crop or shear other sizes of pipe of larger or smaller diameter, it is merely necessary to remove the bushing inserts 4 and 5 and substitute other inserts of greater or lesser thickness, depending upon the size of the pipe to be cropped. Any desired shape of crop on the pipe or tube may be had by merely varying the angle of the blade, that is, the angle between the edges, such as 17 and 18.

Other shapes of crops than that shown at the end of pipe 12 may be provided by modifying the shape of the blade or cutting edges of shearing die 11.

Figs. 7, 8, 9 and 10 show various modifications of the shapes of the blades of the shearing die, as viewed from the bottom thereof, for giving different crop shapes for forming different connections between tubular members. The base die blocks, of course, will be correspondingly shaped. It will be noted that in all these modifications the common feature is that of a centrally disposed blade and plane cutting surface whose edges are divergent and which terminate in an arcuate outer surface.

Thus it will be seen that I have provided a relatively simple, inexpensive but highly efficient shearing die combination for cutting tubing to the desired length and simultaneously shaping the end of the sheared tubing so as to provide a contour adapted to interfit the side of another tube which has been notched. An outstanding feature of the present invention is that in a single downward stroke of the shearing die, two operations are performed, that of cutting the tube to the proper length and that of shaping the end of the tube to the proper contour for joining with another tube either at right angles or a greater or lesser angle as desired. Furthermore, the die involving the present invention is readily adaptable for cutting pipe of different diameters by the mere expedient of replacing bushing inserts within the stationary die blocks.

While I have illustrated and described several specific embodiments of my invention, it will be understood that these are by way of illustration only, and that various changes and modifications may be made within the contemplation of my invention and within the scope of the following claims.

I claim:

1. In a die press of the type adapted to simultaneously shear desired lengths of tubing and shape the confronting ends to form a bicycle joint, in combination, a pair of substantially cylindrical stationary die blocks in closely spaced end-to-end relationship having longitudinally aligned bores for receiving the tubing therethrough and having centrally disposed confronting parallel surfaces in closely spaced relationship and two pairs of outwardly divergent surfaces extending from the terminals of said parallel surfaces, providing a space between said dies of substantially the shape of a butterfly, a movable shearing die having a correspondingly shaped cross-section and which has a longitudinally extending central strip having opposite, longitudinal parallel surfaces, the lowermost end of said strip having an angular-shaped tip, said strip having wings diverging outwardly from the opposite longitudinal sides thereof which terminate in outwardly curved surfaces which form opposite longitudinal sides of the die, giving the die a cross-section of substantially that of a butterfly, the lower end of said movable die having rearwardly diverging flat shearing surfaces corresponding to the angle of said tip, the opposite edges of each of said shearing surfaces diverging outwardly and terminating in outwardly curved surfaces which form opposite longitudinal sides of the movable die, whereby said movable die when moved downwardly through the correspondingly shaped space between said stationary die blocks, will shear a pipe extending through said blocks in two in desired lengths to crop the confronting sheared ends of the pipe to a contour so that it may be fitted into a correspondingly notched side portion of another pipe to which it is to be joined.

2. Apparatus as recited in claim 1 wherein said die blocks have hollow cylindrical inserts whose confronting ends are shaped so as to be flush with the surface of the confronting ends of the die blocks and being replaceable for accommodating pipes of different diameter.

3. Apparatus recited in claim 1 wherein said angular-shaped tip forms an angle of substantially 90° and wherein said diverging edges of said flat shearing surfaces form angles of substantially 60°.

ARVID A. ANDERSON.

REFERENCES CITED

The following references are of record in the file of this patent:

UNITED STATES PATENTS

| Number | Name | Date |
|---|---|---|
| 414,287 | Carnahan | Nov. 5, 1889 |
| 496,167 | McGary | Apr. 25, 1893 |
| 1,044,283 | Stanger | Nov. 12, 1912 |
| 1,138,211 | Graham | May 4, 1915 |
| 1,161,705 | Lloyd | Nov. 23, 1915 |
| 1,513,100 | Frederick | Oct. 28, 1924 |
| 2,064,539 | Hart | Dec. 15, 1936 |

FOREIGN PATENTS

| Number | Country | Date |
|---|---|---|
| 61,677 | Germany | Apr. 6, 1892 |
| 461,561 | France | Oct. 31, 1913 |